UNITED STATES PATENT OFFICE.

MARSHALL TURLY, OF COUNCIL BLUFFS, IOWA.

COMPOSITION OF MATTER FOR PLASTERING.

SPECIFICATION forming part of Letters Patent No. 364,555, dated June 7, 1887.

Application filed November 13, 1886. Serial No. 218,763. (No specimens).

*To all whom it may concern:*

Be it known that I, MARSHALL TURLY, of Council Bluffs, in the county of Pottawattamie and State of Iowa, have invented certain new and useful Improvements in Composition of Matter for Plastering; and I do hereby declare the following to be a full, clear, and exact description of the invention, such as will enable others skilled in the art to which it appertains to make and use the same.

My invention relates to a composition of matter to be used as a plastering compound for plastering the walls of buildings or for other purposes.

Hitherto in mixing the plastering compounds in ordinary use an unnecessarily large proportion of lime or similar alkali has been employed as compared with the amount of sand used; and the object of my present invention is to provide an inexpensive plastering compound in which at least double the amount of sand may be used with the customary quantity of lime or similar alkali; and a further object is to provide a simple plastering compound possessing great strength, durability, and tenacity, and one which may be easily and quickly applied.

My improved compound has for its ingredients the following substances, preferably in about the proportions named, and combined substantially as described: An alkali water of twenty degrees or thirty degrees strength, more or less, as tested by an alkalinometer, is first compounded by dissolving any suitable alkali together with resin, or its equivalent, in water; and to mix a sufficient quantity of plaster to spread with a suitable degree of thickness over about a square yard of surface about a pound of flour, or a pound and a quarter of shorts, or a pound and a half of bran is added, together with a pound of lime or its equivalent, when slaked, and six or eight pints of sand. These cereals are either substitutes for each other, or when the three are used together the amount of each is reduced proportionately. When the ingredients are combined substantially as described, the plaster is properly tempered before spreading it by mixing in a brackish liquid formed by combining a suitable alkali—for example, a pound of potash—with about twenty gallons of water.

It will be observed that the component parts of my plastering compound are reduced to a minimum and each ingredient has its peculiar properties, which especially adapts it for its place in the compound. The effect of the alkali upon the cereals is to reduce it to a pulp or paste as sticky and adhesive in consistency as glue. The lime neutralizes the lye or other alkali used; the resin increases the tenacity of the plaster and makes it impervious to water; the brackish water tends to harden all the ingredients into a compact mass, while the sand gives a hard, durable, and stone-like body to the compound. Lime is not an absolutely essential element of the compound, and might be entirely dispensed with and produce good effect. However, as a general rule, I prefer its use, and it should be stated that when bran only is used it is preferably combined with an alkali before being mixed with the other ingredients. This particular process is unnecessary with the flour or shorts.

Plainly, the cost of my compound is greatly reduced because of the large amount of sand employed to the proportionate small amount of other and more costly ingredients; and not only is this important advantage to be attained, but also the plaster itself possesses manifold good qualities. It may be spread smoother and much thinner than ordinary plaster without the use of hair to hold the particles together, preventing just as much air from forcing its passage through the wall, possesses great adhesiveness, and will cohere as well to paper or pasteboard as to wood, and is not easily bruised or crumbled.

It is evident that the consistency of each coat might be varied according to the strength and adhesiveness required, and that other slight changes might be resorted to in the exact proportions of ingredients used and in their manner of combination, without departing from the spirit and scope of my invention; hence I do not wish to limit myself to the particular combinations of ingredients herein set forth; but, Having fully described my invention, what

I claim as new, and desire to secure by Letters Patent, is—

1. A plastering compound composed of cereal albumen, resin, and sand, combined with a suitable alkaline solution, in the manner and proportions substantially as described.

2. A plastering compound composed of flour, shorts, or bran, combined with resin, sand, and a suitable alkaline solution, in the manner and proportions substantially as described.

In testimony whereof I have signed this specification in the presence of two subscribing witnesses.

MARSHALL TURLY.

Witnesses:
G. W. CHAMBERLIN,
J. C. LANGE.